William R. Wickerham.

Dec. 18, 1956 W. R. WICKERHAM 2,774,923
ELECTRIC CONTROL FOR ALTERNATING-CURRENT MOTOR
Filed March 21, 1952 5 Sheets-Sheet 3
Fig. 2.
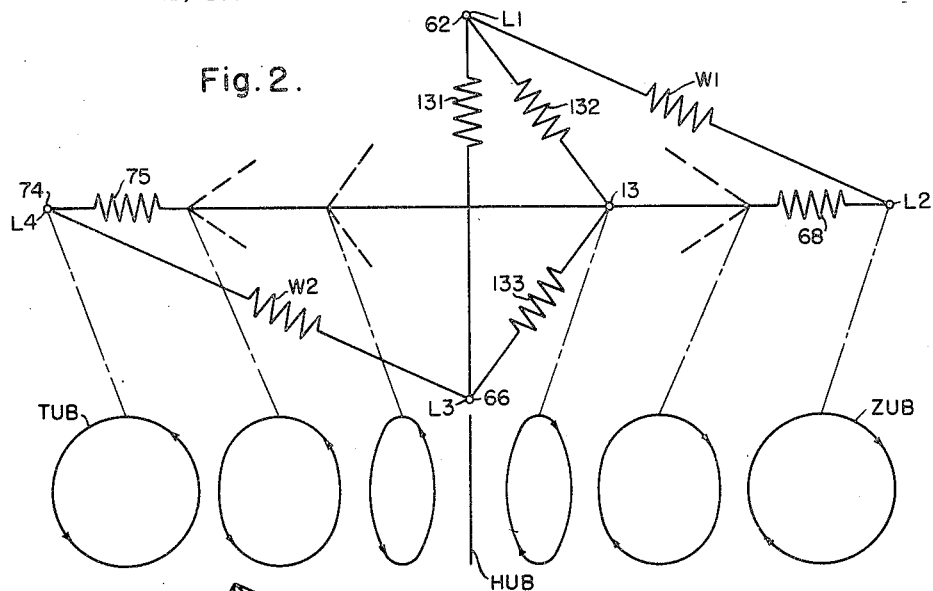
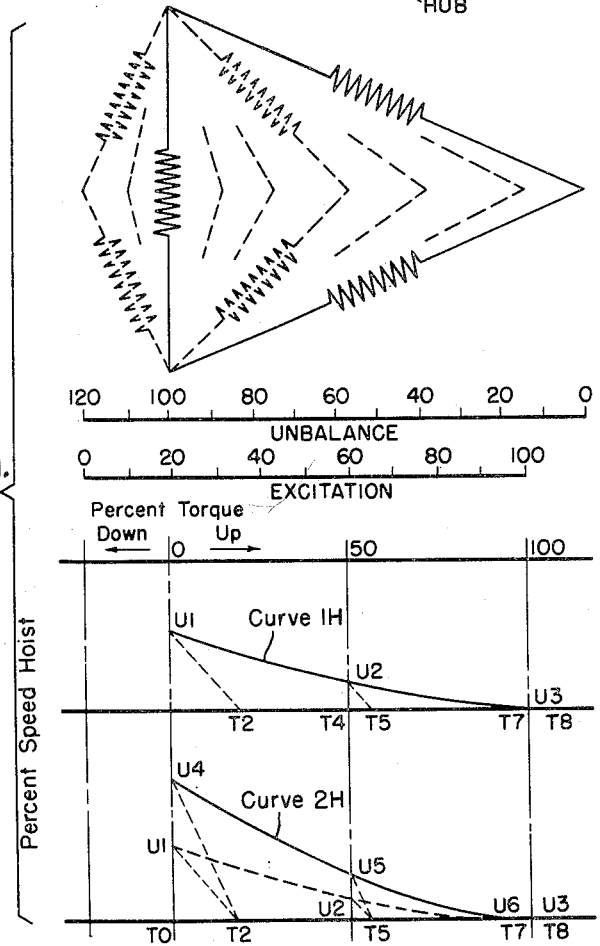
Fig. 3a.
INVENTOR
William R. Wickerham.
BY
Paul E. Frickemann
ATTORNEY

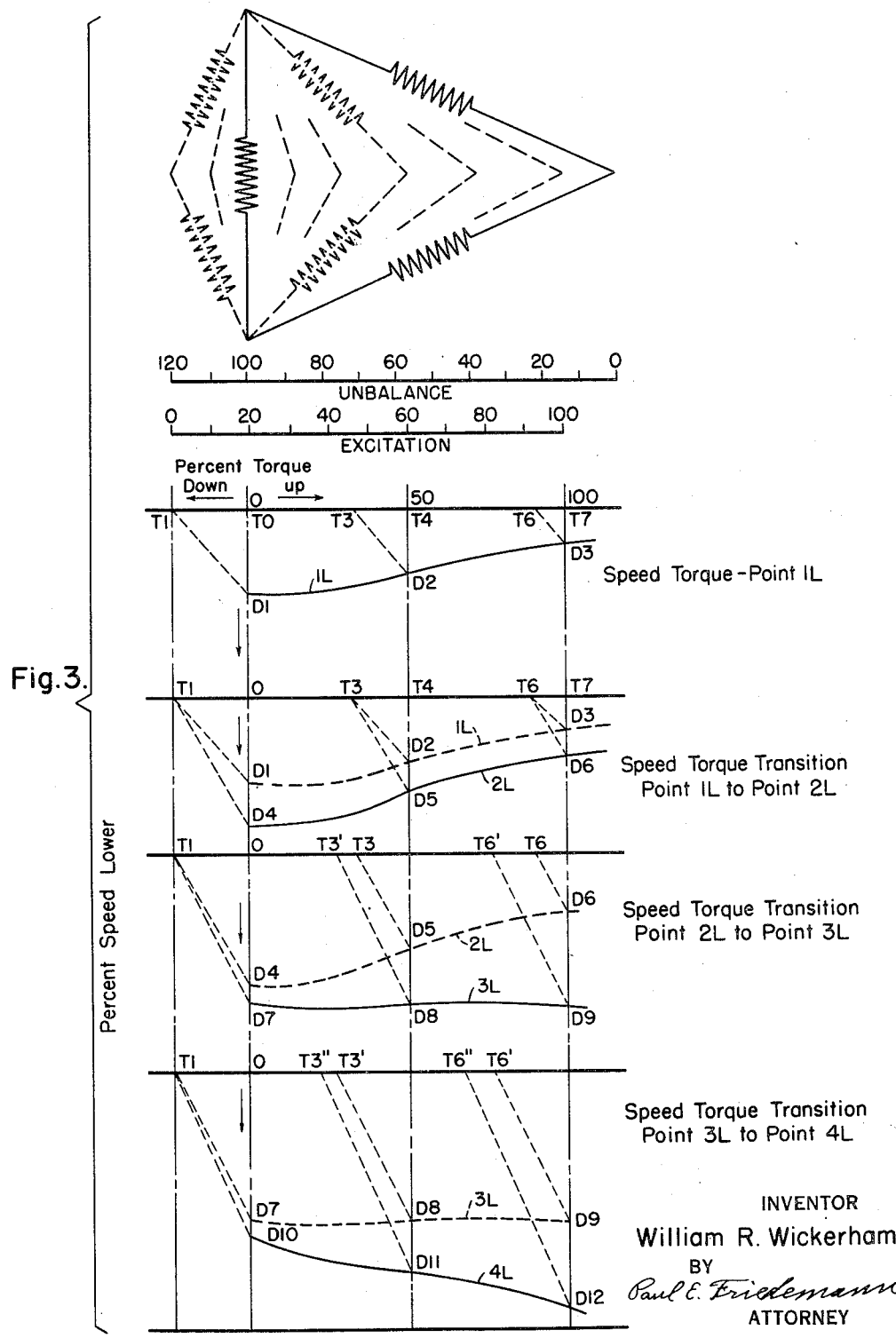

Dec. 18, 1956   W. R. WICKERHAM   2,774,923
ELECTRIC CONTROL FOR ALTERNATING-CURRENT MOTOR
Filed March 21, 1952   5 Sheets-Sheet 5

WITNESSES:
Robert C Baird
Leon M. Garman

INVENTOR
William R. Wickerham.
BY
Paul E. Friedemann
ATTORNEY

United States Patent Office 2,774,923
Patented Dec. 18, 1956

2,774,923

ELECTRIC CONTROL FOR ALTERNATING-CURRENT MOTOR

William R. Wickerham, Buffalo, N. Y., assignor to Westinghouse Electric Corporation, East Pittsburgh, Pa., a corporation of Pennsylvania Application March 21, 1952, Serial No. 277,749

6 Claims. (Cl. 318—202)

My invention relates to control systems for alternating-current induction motors to be used to operate cranes, mine hoists, and other hoisting and elevating devices.

An induction motor, provided with the usual simple reversing and rheostatic type of control, tends to run only at full speed and cannot hold back until forced to run at a speed above synchronous speed. Such operation is highly undesirable for the lowering of overhauling loads. It is thus apparent that the problem is to attain effective speed control of the motor between zero speed and full speed during the lowering of an overhauling load.

It is a broad object of my invention to provide a system of control for an induction motor operating hoisting equipment that will improve the torque conditions and operating speeds of the motor when effecting the lowering of an overhauling load.

Another broad object of my invention, for a load being lowered by an induction motor operating a hoist, is the provision for automatically reducing the lowering speed with an increasing load.

It is also an object of my invention to limit the hoisting speed to relatively low speeds for certain control conditions when the load is relatively light.

It is an object of my invention to obtain with alternating-current motors in hoist applications a stabilized sub-synchronous speed down to small fractions of the synchronous speed with the aid of control devices responsive to selected speed settings and the load on the motor and which are disposed outside of the internal connections of the motor to thus permit the use of motors of standard design for this purpose.

A further object of my invention is to obtain a torque reversing control by providing a voltage unbalance as a function of the motor load and the operation of a master controller.

Another broad object of my invention is the provision of a control for an induction motor whereby the phase balance of the motor may be varied from zero unbalance to considerably more than 100% unbalance, and where such variation of phase unbalance may, for any selected range of unbalance, when desired, be made in micrometric steps.

It is also an object of my invention to change the phase balance of an induction motor as a function of either the load on the motor, or the speed of the motor, or the selected setting of adjustable control apparatus, or a fixed bias unbalance, or any combination of any two or more of these functions.

The objects expressed are merely illustrative. Other objects and advantages, as well as the means provided by my invention for achieving them, will become more apparent from a study of the following specification and the accompanying drawings, in which:

Fig. 2 is a diagrammatic showing of some of the basic circuits of my invention; and Figs. 3, 3a, 4, and 5 show families of curves, namely, speed-torque characteristic curves, obtained by a hoist control system built in accordance with my invention.

Figure 1:
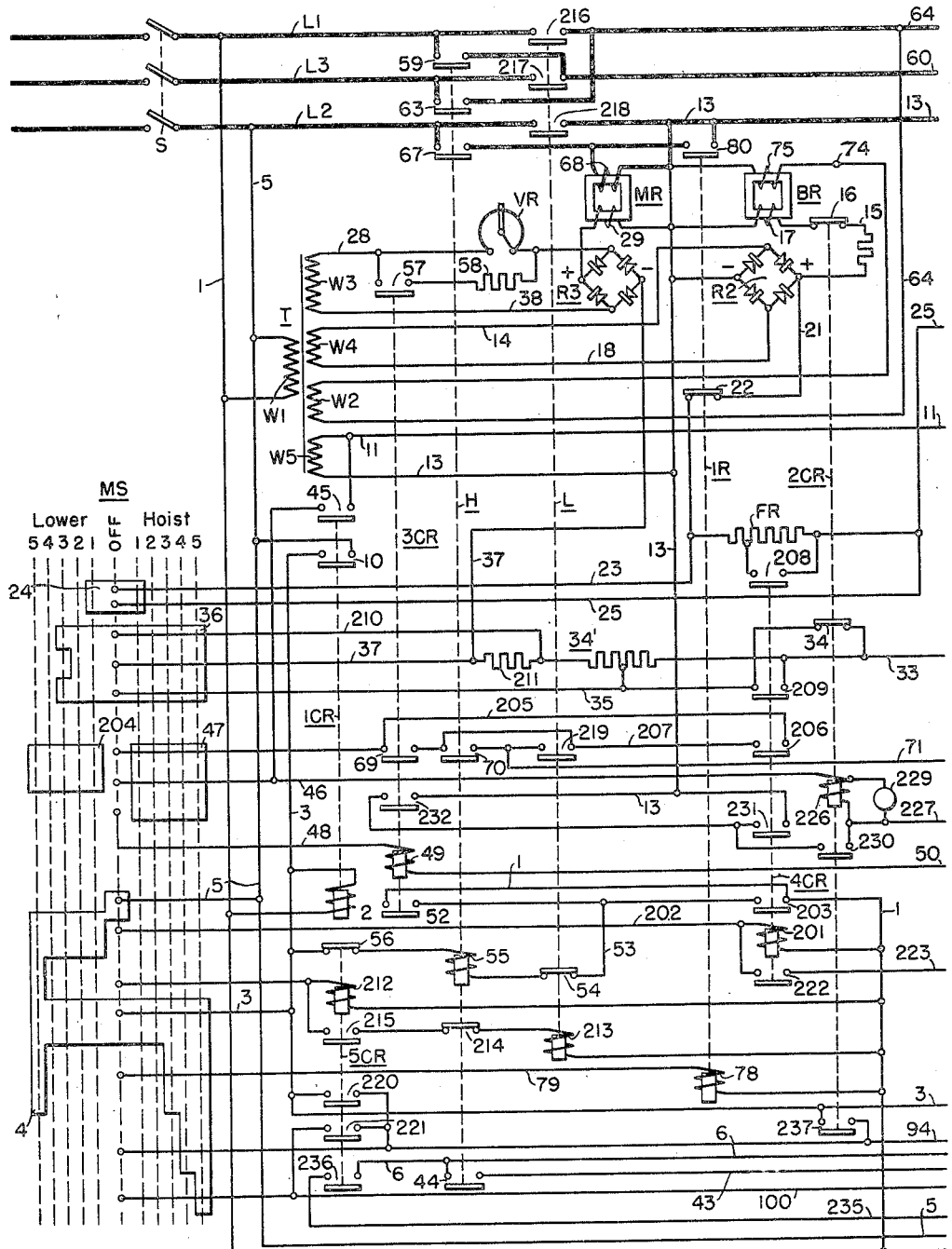
Figures 1 and 1a are a diagrammatic showing of a motor control system embodying my invention.
Figure 1A:
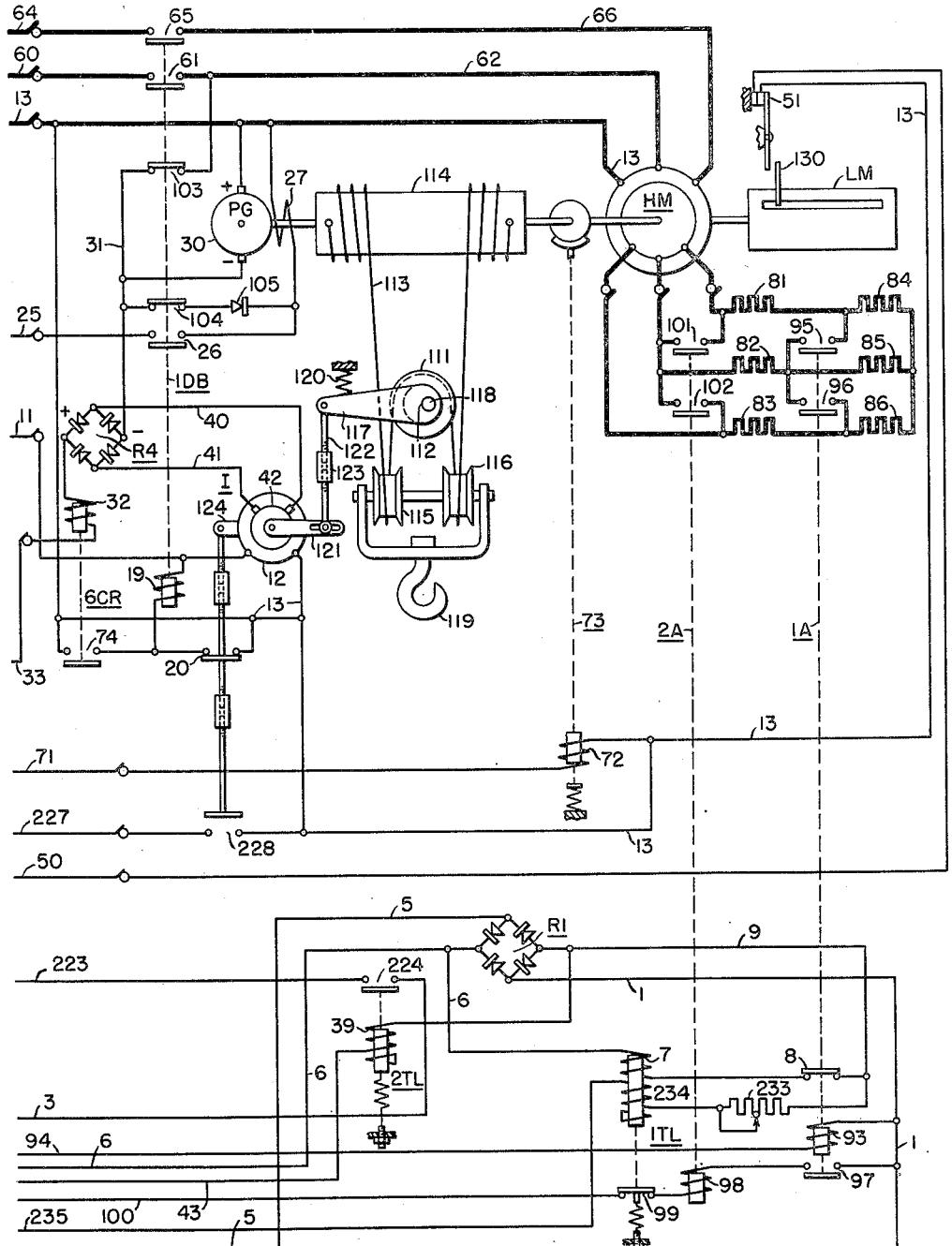

In Figs. 1 and 1a, HM represents the hoist motor for driving the hoist drum 114, the pilot generator PG, and the limit switch mechanism LM. The mechanism LM has the traveling dog 130 for operating the limit switch 51 when the hook 119 is at its upper limit of travel.

The hoist drum 114, as is the case for all cranes in general use, is designed to handle two cable ends with the loop portion traversing the hook sheaves 115 and 116 and an equalizer sheave 111 disposed between the hook sheaves.

The pilot generator I select is not merely a tachometer for measuring the speed of the hoist drum, but the pilot generator is selected as a fairly sizable exciter with reference to the hoist motor and having a voltage output proportional to speed. By selecting a pilot generator somewhat larger than would normally be necessary if a speed signal only were needed, I am able to use the pilot generator for dynamic braking purposes during stopping, and use the voltage output during running for altering the phase unbalance of the hoist motor.

The phase unbalance on the motor HM is produced by the combined action of the main reactor MR and the biasing reactor BR.

To understand the functions of the reactors, reference should be had to the showing in Fig. 2. The motor primary windings 131, 132, and 133 are shown as connected in delta with the alternating-current supply lead L1 connected to the motor terminal 62, and the alternating-current supply terminal L3 connected to motor terminal 66. The motor terminal 13 is connected to the supply conductor L2 through the alternating-current winding 68 of the main reactor MR. The primary winding W1 of the phase-shifting transformer T is connected across supply leads L1 and L2. The alternating-current winding 75 of the bias reactor BR is connected across conductor 74 and the motor terminal 13, and the secondary winding W2 of the phase-shifting transformer T is connected across motor terminal 66 and conductor 74.

If the reactance of winding 68 is at a zero value and the reactance of winding 75 is high it is apparent that the motor terminals 62, 13, and 66 will be in effect connected directly to the supply leads L1, L2, and L3. Under these conditions the motor energization may be considered as fully balanced. The phase rotation will be as indicated by circle ZUB.

If the reactance of winding 75 is reduced to zero and a high reactance is assumed for winding 68, it is apparent that conductor 74 will in effect correspond to a fourth phase with the armature terminal 13 shifted in phase so as to be connected directly to conductor 74. Under this condition the phase rotation will be as indicated by circle TUB and the unbalance, with reference to the balance condition above mentioned, may be considered as a 200% unbalance.

By proper selection of the resistance value of resistor 15 and the voltage changes taking place in the circuit including winding 17 to alter the excitation of winding 17 to thus change the reactance of winding 75, the maximum unbalance possible may be adjusted, for example, to be 120% when the reactance of winding 68 is at the maximum reactance value it is to have for the required operating characteristics selected.

The horizontal shifting of motor terminal 13 is, of course, also a function of the reactance of winding 68. By changing the excitation of the direct-current winding 29 from its selected minimum, which may be zero, to higher values, the unbalance may be changed from 120% to zero unbalance, at which zero unbalance armature terminal 13 may be considered as connected directly to supply lead L2.

The phase rotation will be as indicated by circle ZUB representing zero unbalance. At 100% unbalance, represented by the line HUB, there is, of course, no torque. By providing a fine adjustment of the excitation current in winding 29 as by the vernier VR, the electric position of terminal 13 with reference to conductor 74 and supply lead L2 may be made in micrometric steps.

To get the valuable characteristics from my system of control for a hoist application, I make the excitation of winding 29 a function of the setting of control apparatus which includes the adjustment of the biasing reactor BR, a function of the hoisting speed, and a function of the load on the hoist hook.

A still better understanding of my invention may be had from a study of the operating functions thereof for the various work conditions encountered in practice.

When operation of the apparatus is to be effected, the switch S is closed to connect the energized supply buses shown to the leads L1, L2 and L3.

An energized circuit is thus established from lead L1 through conductor 1, actuating coil 2 of the control relay 1CR, conductor 3 to the controller segment 4 of the master controller MS, and conductor 5 to the lead L2. A second circuit is established from conductor 1 through the primary winding W1 of the phase-shifting transformer T to conductor 5. The transformer secondaries W2, W3, W4 and W5 will thus be energized to have an output voltage at their terminals.

A third circuit is established from conductor 1 through the full-wave rectifier R1 (see Fig. 1a), conductor 6, the magnetizing winding 7 of the inductive time limit relay 1TL, the normally closed contacts 8 of the accelerating contactor 1A, conductor 9, through the rectifier R1 to conductor 5. Operation of the relay 1CR effects the closing of contacts 10. Relay 1CR is thus held in by its own contacts 10. Operation of the master controller from the off position, therefore, does not affect the operation of relay 1CR.

The energization of transformer secondary W5 establishes an energizing circuit from its upper terminal, through conductor 11, through the primary winding 12 of the inductor I and conductor 13 to the lower terminal of the secondary W5.

One of the valuable contributions made to the art by my invention is the use of the inductor and the elements that control its function and the elements that are controlled by its output. The function of the inductor is unusual, but the device itself is the widely used repulsion-induction motor so designed that its rotor output is sensitive to the position of the rotor with reference to the stator.

All cranes in general use at present have a rope, or cable, system-equalizer sheave, namely, the sheave 111 shown in Fig. 1a. This sheave is rotatably mounted on suitable roller bearings, on an axis 112 fixed on the crane frame. The cable 113 coming from one section of the hoist drum 114 traverses the hook sheave 115, thence passes over the equalizer sheave 111, over the second hook sheave 116, back to the second portion of the hoist drum.

The crank arm 117 has its hub end rotatably mounted in suitable roller bearings within the sheave 111, but its axis 118 is a short distance to the left of the axis 112 of sheave 111. The result is that any load on the hook 119 will cause crank arm 117 to rotate in a clockwise direction against the spring 120 by an amount that is a measure of the load on the hook.

The crank arm 117 is coupled to the crank arm 121, connected to the rotor of the inductor I by the link 122 including the turnbuckle 123. With no load on the hook, the turnbuckle 123 is adjusted so that the output at the terminals 40 and 41 of the inductor I is zero; that is, the input to rectifier R4 at the alternating-current terminals is zero. It will be noted that the effective length of the crank arm 121 is also made adjustable. The adjustment of the effective crank-arm length is so made that with full load on the hook and the master controller MS in the first point, lowering an output on terminals 40 and 42 is produced to effect a suitable lowering speed of the load. This will become more apparent from the discussion of the lowering operations made hereinafter.

A second crank arm 124 is also coupled to the rotor of the inductor I for actuation of the contacts 20 and 228. The contacts 20 are actuated through the adjustable links shown, and in normal operation the adjustment is such that the contacts 20 open shortly after the contacts 74 of the control relay 6CR close and the load builds up and contacts 228 close when the load on the hook is above the rated load.

A further energized circuit is established by the closing of switch S. This circuit may be traced from the upper terminal of the secondary W4 through the conductor 14, the full-wave rectifier R2, resistor 15, the back contacts 16 of the control relay 2CR, the direct-current winding 17 of the biasing reactor BR, conductor 13, the full-wave rectifier R2, and conductor 18 to the lower terminal of the secondary W4.

Another circuit may be traced from conductor 11 through the actuating coil 19 of the dynamic braking contactor 1DB, contacts 20 to the energized conductor 13. Operation of the contactor 1DB effects the opening of contacts 103 and 104 and the closing of contacts 26, 61, and 65. The opening of contacts 104 opens the self-exciting circuit for the field winding of the pilot generator PG.

The closing of contacts 26 establishes a circuit from the positive terminal of rectifier R2 through conductor 21, contacts 22 of contactor 1R, conductor 23, controller segment 24, conductor 25, contacts 26, field winding 27 to the conductor 13, also comprising one of the motor terminals, to the negative terminal of the rectifier R2. From the circuit traced, it is apparent that field winding 27 is heavily excited, thus assuring a maximum voltage output from the pilot generator when it is operated.

A circuit is established from the upper terminal of the secondary W3 through conductor 28, vernier resistor VR, the rectifier R3, the direct-current winding 29 of the main reactor MR, conductor 13, the armature 30 of the pilot generator PG, conductor 31, the rectifier R4, actuating coil 32 of the control relay 6CR, conductor 33, back contacts 34 of control relay 2CR, conductor 35, controller segment 36, conductor 37, and rectifier R3 to the conductor 38 connected to the lower terminal of secondary W3. It will be noted that the output terminals 40 and 41 of the secondary winding 42 of the inductor I are connected to the alternating-current terminals of rectifier R4. From these circuits just traced, it is thus apparent that the excitation of winding 29 is a function of the outputs of the rectifiers R3 and R4 and of the pilot generator PG, that is, a function of the setting of the vernier resistor VR, the output voltage of the inductor I, and the output of the pilot generator PG.

The operation of contactor 6CR effects the closing of contacts 74. The energization of the dynamic braking contactor 1DB is thus made independent of the position of the contacts 20, which contacts 20 open shortly after contacts 74 close; that is, contacts 20 open as soon as there is some compression of spring 120 by reason of some loading on the sheave 111. Contacts 20 may be adjusted close for loads as light as the chains on the otherwise empty hook.

When the master controller MS is moved to the first point hoist, a circuit is established from conductor 11 through the contacts 45, conductor 46, controller segment 47, conductor 48, actuating coil 49 of the control relay 3CR, conductor 50, limit switch 51, and conductor 13 to the lower terminal of secondary W5.

Operation of the control relay 3CR effects the closing of contacts 52, 57, 69, and 232. The closing of contacts 52 establishes a circuit from conductor 1 through contacts 52, conductor 53, back contacts 54 of the lowering directional contactor L, actuating coil 55 of the hoisting directional contactor H, contacts 56 of the control relay 5CR, conductor 3 and contacts 10 to conductor 5. The closing of contacts 57 connects the resistor 58, having a relatively low resistance value, in parallel to the vernier resistor VR. The result is that secondary W3 produces its maximum effect on the circuit including the winding 29. The closing of the contacts 69 and 232 does not at this time effect any operation.

The operation of the hoist contactor H effects the opening of the electric interlock contacts 214, and the closing of contacts 44, 59, 63, 67 and 70.

The closing of contacts 44 establishes a circuit from the energized conductor 9 through the actuating coil 39 of the time limit relay 2TL, conductor 43, contacts 44, to the energized conductor 6. The operation of the time limit relay 2TL does not as yet produce its useful effect.

The closing of contacts 59 establishes a circuit from lead L1 through contacts 59, conductor 60, and contacts 61 to one motor terminal 62. The closing of contacts 63 establishes a circuit from lead L3 through contacts 63, conductor 64, contacts 65 to a second motor terminal 66, and the closing of contacts 67 establishes a circuit from lead L2 through contacts 67, and the alternating-current winding 68 of the main reactor MR to the third motor terminal 13.

The closing of contacts 70 establishes a circuit from the energized controller segment 47 through contacts 69 and 70, conductor 71, the brake coil 72 of the brake 73 to the energized conductor 13. The brake is thus released so that the hoist motor HM may now operate the hook in the hoist direction.

The selection of resistor 58 is such that with no load on the hook 119 and the controller still in the first hoist postion now being considered, a voltage output is produced at the direct-current terminals of the rectifier R3 that the winding 29 unbalances the motor about 85%, where the motor produces a hoisting torque T2, as shown in Fig. 3a, and is unopposed by a load. This also means that the inductor I produces no effect on winding 29. The motor now accelerates in the hoisting direction, and the pilot generator PG, being heavily excited, generates a relatively high voltage, which voltage acts in opposition to the voltage of the rectifier R3. With increase in speed, the excitation of winding 29 decreases until the unbalance is 100%, the torque disappears and the motor runs at speed U1.

As more and more load is added, the torque again appears as, for example, the torques T4, T5, T7, and T8. At torque T5 the effect of the inductor I, namely, the output of rectifier R4 and the output of rectifier R3, is such at zero speed that the unbalance is at about 55%. The full speed is thus U2, the torque T4, the unbalance about 58% and the load 50% of full load.

At torque T8 for zero speed, the effect is such that the motor speed is almost zero. At this very low speed represented by a full-speed torque of T7, the hook and chains are thus very gently applied to the load. From the curve 1H shown both in Figs. 3a and 5, it is apparent that even an empty hook is accelerated very slowly, and at its full speed for the first point hoist, the speed is only about 17% of the normal motor speed. This is a very valuable contribution to the art.

When the master controller is moved to the second point hoist, the shunting circuit, comprising the conductor 23, controller segment 24 and conductor 25, for the field resistor FR is opened. The excitation of the pilot generator is thus very materially reduced.

The zero speed torque at no load will thus again be T2 and the zero-speed motor unbalance will be at 85% but as the pilot generator speed increases, its opposing effect is much less and as a result the speed rises to U4. At half load the speed will be U5, and at full load the speed is U6, which speed is not much greater than speed U3. From Figs. 3a and 5, it will be apparent that the speed torque curve 2H has a very desirable shape. At full load the hook speed is very low, thus allowing a very gentle start of the load.

Figure 5:
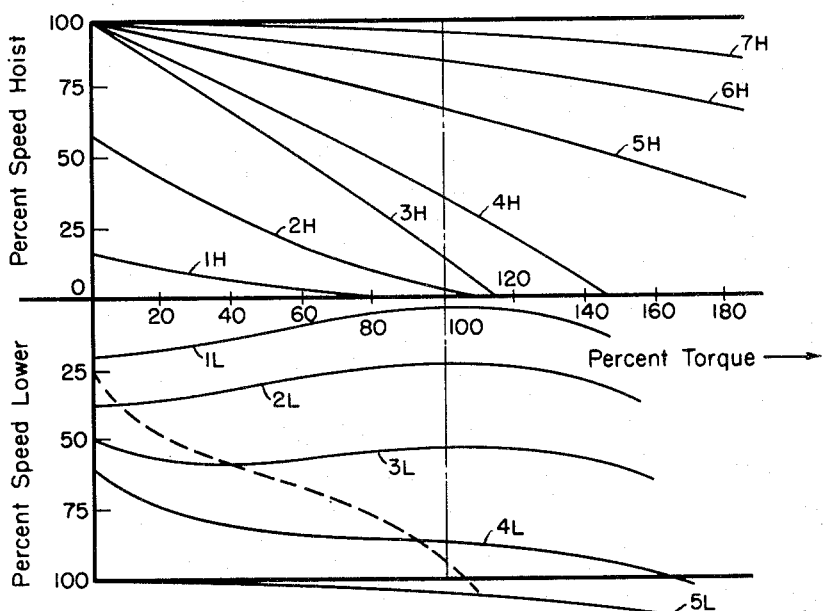

Movement of the master controller to the third point hoist establishes a circuit from conductor 1 through the actuating coil 78 of the main reactor-eliminating contactor 1R, conductor 79, to the energized controller segment 4. The operation of contactor 1R opens the field excitation circuit for the field 27 of the pilot generator PG and closes the contacts 80. Contacts 67 and 80 thus shunt the coil 68. The motor terminal 13 is thus connected directly to the lead L2. The unbalance disappears entirely and the motor torque and speed are determined entirely by the resistance in circuit with the secondary winding of the induction motor. Since all of the resistor sections as 81, 82, 83, etc., are in the secondary circuit, the speed torque curve 3H will be as indicated in Fig. 5.

For the fourth hoist position of the master controller, an energized circuit is established from energized conductor 1 through the actuating coil 93 of the accelerating contactor 1A, and conductor 94 to the energized controller segment 4. The operation of contactor 1A by the closing of contacts 95 and 96 eliminates the resistor sections 84, 85 and 86 from the motor secondary. The speed torque curve 4H is thus as shown in Fig. 5.

The operation of the accelerating contactor 1A also effects the opening of contacts 8 to thus open the circuit for the magnetizing winding 7 of the time limit relay 1TL. After the lapse of a selected time interval, contacts 99 are closed, whereupon a circuit is established from conductor 1 through contacts 97, coil 98 of the accelerating contactor 2A, contacts 99 and conductor 100, to the energized controller segment 4. The contactor 2A, by the closing of contacts 101 and 102, eliminates the resistor sections 81, 82 and 83 to further accelerate the hoist motor HM. The speed torque curve 5H shows the operating characteristics for this controller position.

In an actual application made of my invention, the secondary winding actually included six additional resistor sections, which might be designated resistor sections 87, 88 and 89 and 90, 91 and 93 (not shown). This application required two additional accelerating contactors and the necessary time limit relays so that speed torque curves, such as shown by 6H and 7H, were produced.

When the hoisting is to be stopped, the master controller may be moved either to the neutral position or plugged to some one of the lowering positions.

If the controller is moved to the neutral position, many of the circuits heretofore discussed are deenergized. A detailed analysis is not necessary for those skilled in the art, but it is to be noted that 3CR is deenergized, which effects the deenergization of contactor H to disconnect the motor HM from the alternating-current buses and the dynamic braking contactor 1DB is deenergized. The contactor 1DB is deenergized because 6CR is deenergized by the opening of contacts 57 and thus opens its contacts 74. Contacts 20 are open at this stage.

The deenergization of the dynamic braking contactor 1DB opens contacts 26, 61 and 65 and closes contacts 103 and 104. The pilot generator is thus connected to the motor terminals 13 and 62 to effect dynamic braking.

At the same instant the dynamic braking circuit is established, the brake 73 sets to bring the load to a stop.

Upon power failure on the alternating-current buses, the conditions are the same for stopping as if the controller had been moved to the neutral position, except that 1CR drops out, making it necessary to move the controller to the neutral position before power can be applied to the motor. The rectifier 105 prevents deenergization of the field winding 27 in case power fails during hoisting when the pilot generator has its upper terminal positive.

The lowering operation is effected by moving the master controller to the first point lowering. With the controller in the first point lowering, a circuit is established from the conductor 1 through the actuating coil 201 of the control relay 4CR through conductor 202 to the energized controller segment 4.

The operation of relay 4CR closes the contacts 203, 206, 208, 209, 222, and 231. A circuit is thus established from conductor 1 through contacts 203, conductor 53, contacts 54, actuating coil 55 of the hoist directional contactor H and contacts 56 to the energized conductor 3.

Operation of contactor H applies power to leads 60 and 64 through contacts 59 and 63, and supplies power to motor terminal 13 through contacts 67 and the winding 68 of the main reactor MR.

It should be remembered that the dynamic braking contactor is energized and that relay 6CR is energized during this stage of operation. This means the field 27 of the pilot generator PG is heavily energized, since the field resistor FR is shunted by segment 24, and that applying power to leads 60 and 64 applies power to the motor terminals 62 and 66 through the contacts 61 and 65.

The operation of H also establishes a circuit from the energized conductor 46 through controller segment 204, conductor 205, contacts 206, conductor 207, contacts 70, conductor 71 and the brake coil 72 to the conductor, or motor terminal, 13. The brake is thus released.

If there is no load on the hook, the driving down torque will be T1, see Fig. 3, but if there is a load on the hook, the torque will be some other value as for example T3 or T6.

With no load on the hook 119 and the hoist motor at rest with power applied, as above pointed out, the unbalance will be 120% and the motor lowering torque will be T1. The motor will then accelerate in the lowering direction accompanied by increase of excitation and a decrease in unbalance. When the motor speed reaches speed D1, zero speed, the unbalance has been reduced to 100% and the torque is T0, namely, zero. The motor thus does not change its speed. The main reactor excitation for this no-load condition originates mainly in the pilot generator. The polarity of the pilot generator will be opposite to the polarities shown.

If there be a 50% of full load on the hook 119 and the motor HM is at standstill, the load inductor will excite the main reactor to about 45% of normal. This reduces the unbalance to about 72% and causes the motor to produce torque T3. The torque T3 is less than torque T4 which is the torque the load is exerting on the hoist drum 114. The motor HM is thus overhauled and accelerates in the lowering direction. The speed of the pilot generator thus increases and as a result, exciting current is added to winding 29 to that already produced by the inductor I. The unbalance is thus decreased to 57%, corresponding to speed D2. At this speed the motor torque balances the load torque T4, and there is no further acceleration.

With full load on the hook, the output of the load inductor rises. This rise in output of the inductor raises the excitation of winding 29 to 92% of full value which reduces the unbalance to such an extent that there is only a 24% unbalance, and at which unbalance the motor can develop torque T6. Since this torque is less than the torque T7 being exerted by the load on the hoist drum 114, the motor is overhauled to speed D3, at which speed the effect of the pilot generator is to further decrease the unbalance. At speed D3, the motor torque balances torque T7 and no further increase in the overhauling speed takes place. The curve 1L drawn through speed points D1, D2, D3 is the lowering speed locus characteristic such as would be developed with changes of load in the first point lowering of the master controller.

When the master controller is moved to the second point lowering the field winding 27 of the pilot generator, PG is weakened because the segment 24 opens the circuit for the field resistor shunting leads 23 and 25. The circuit for field 27 may now be traced from the energized conductor 21, contacts 22, a few sections of the field resistor FR, contacts 208, conductor 25, contacts 26, and field 27 to the energized conductor 13.

Since the field 27 is weakened, the effect of the pilot generator on winding 29 is decreased and a greater speed is necessary to again produce a stable excitation. For the no-load, half-load, and full-load conditions, speeds D4, D5 and D6 are necessary. The second speed-load locus, represented by curve 2L, will have the same general slope as curve 1L, because the speed signal of the pilot generator is about equally effective for all speeds.

For the third lowering position, conductor 37 is disconnected from the controller segment 36. The excitation circuit for winding 29 now includes resistor 211. The circuit for this change may be traced from energized conductor 33, through contacts 209, conductor 35, controller segment 36, conductor 210, and resistor 211 to the energized conductor 37. In this connection it might be noted that for the lowering operations, when 4CR is energized, the contacts 209 are closed to shunt a section of resistor 34', thus reducing the resistance of the excitation circuit for winding 29 during the lowering operation and thus making that circuit more effective.

Since the insertion of resistor 211 in the excitation circuit for winding 29 weakens the effect of both the pilot generator and the inductor, the speeds required for no-load, half-load, and full-load change to D7, D8 and D9, respectively. The speed-load curve 3L represents this operation.

For the fourth lowering position of the controller conductor 35 is disconnected from the segment 36 and in consequence the resistance of the exciting circuit for winding 29 is further increased by the insertion of certain sections of resistor 34'.

The weakened load signal for the third and fourth positions has the effect of causing torque T3 and torque T6 to recede from torque T4 and torque T7, respectively, to the new torque positions T3' and T3" and T6' and T6", so that for the higher loads the speed signal must be proportionately greater and hence the speed higher.

The speed load curves for the third and fourth lowering positions are represented by the curves 3L and 4L, respectively, shown in Figs. 3 and 5.

When the controller is moved to the fifth lowering position, a circuit is established from conductor 1 through the actuating coil 212 of the control relay 5CR to the energized controller segment 4. Operation of relay 5CR closes contacts 215, 220, 221 and 236, and opens the contacts 56. The opening of contacts 56 interrupts the circuit for the coil 55 of the hoist directional contactor H. The hoist contactor thus closes contacts 214, establishing a circuit from conductor 1 through actuating coil 213 of the lowering directional contactor L, the contacts 214 and 215 to the energized controller segment 4.

When control relay 5CR is operated, contacts 236 are closed. This operation establishes a circuit from conductor 9 through the adjusting resistor 233, the neutralizing winding 234, conductor 235, and contacts 236 to conductor 6. The drop-out operation of the time limit relay is thus speeded up.

The operation of contactor L closes the contacts 216, 217, 218, and 219 to connect the motor terminals 13, 62 and 66 to the alternating-current supply leads, and to now maintain the circuit for the brake coil 72 from energized conductor 207 through contacts 219, conductor 71, and brake coil 72 to the energized conductor 13.

Another circuit is established from conductor 1 through the actuating coil 93 of the accelerating contactor 1A, conductor 94 and contacts 220 to the energized conductor 3. Since the contactor 1A closes contacts 97, the accelerating contactor 2A is also energized by a circuit from conductor 1 through contacts 97, coil 98, contacts 99, conductor 100, and contacts 221 and 220 to the conductor 3.

When control relay 4CR is operated, it closes a holding circuit for itself through contacts 222, conductor 223, contacts 224 of the time limit relay 2TL to the conductor 3. This holding circuit assures that relay 4CR remains energized for a definite time interval after the controller is moved to the off position or during power failure of the alternating-current supply.

A still further circuit is established from conductor 1 through coil 78 and conductor 79 to the controller segment 4. The field circuit 27 is thus opened at contacts 22 and the winding 68 is shunted out by contacts 80. The hoist motor thus runs at synchronous speed if there is no load on the hook or runs somewhat above synchronous speed if there is a load on the hook. With an overhauling load, power is returned to the line regeneratively.

If power fails or the controller is moved to the off position, the dynamic braking circuit is established and the brake sets.

If an attempt is made to lower or hoist a load greater than the rated load of the machine, the load sensitive device closes contacts 228, whereupon a circuit is established from energized conductor 46 through the actuating coil 226 of control relay 2CR, conductor 227, and contacts 228 to the conductor 13. This circuit may include an alarm or lights as 229 to warn the attendant that the load is in excess of the capacity of the equipment. This safety circuit and alarm circuit is held in by the contacts 230 and 231 or 232, depending on whether an attempt is being made to lower an excessive load, or hoist an excessive load.

Figure 4:
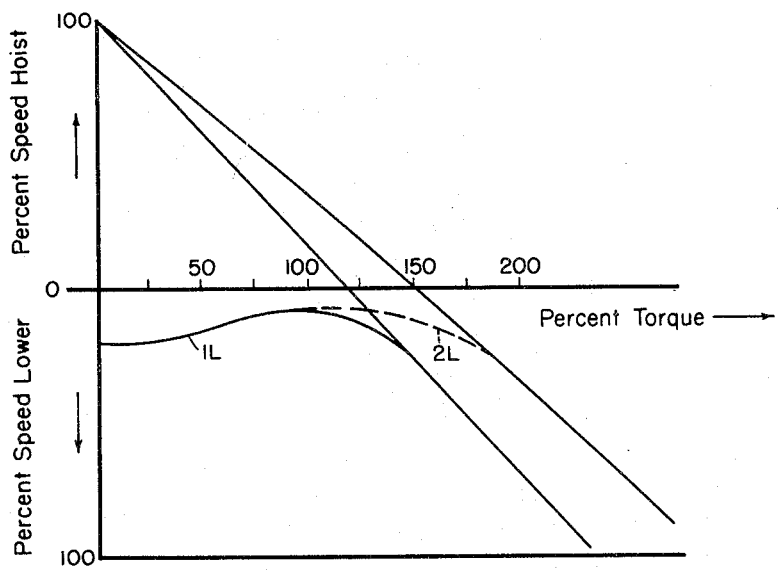

From the showing in Fig. 4, it is apparent that for full load on the crane hook and lesser loads, the motor rotor resistance will be such as to produce a speed-torque characteristic as evidenced by curve 1L. This curve represents the absolute limit of torque that the motor can produce with full load or less on the hook. The average current will be a trifle less than 125% normal for the heavier loads, and somewhat less for the lighter loads. To handle overloads, the operation of relay 2CR is effected by the closing of contacts 228. The operation of relay 2CR thus closes contacts 237 to effect the removal of the resistor sections 84, 85 and 86 by the energization of contactor 1A from conductor 94 through contacts 237 to conductor 3. Under this condition the curve 2L represents the ultimate torque obtainable. This condition is associated with higher exciting load currents in the neighborhood of 150%. To safeguard the equipment, the high exciting current can appear only while the master controller is not in the off position. In other words, when the controller is in the off position, relay 2CR cannot be energized to open the contacts 16.

In addition to the many advantages provided by my control, I provide for vernier control during all points lowering. The vernier control is of special advantage during the first point lowering when the lowering speed is to be brought down to zero in very small increments, if desired, for very careful and gentle handling of a load. This is accomplished by merely slowly moving the vernier arm to increase the boosting current in the excitation circuit of the main reactor for the purpose of increasing the motor retarding torque.

While I have shown but one embodiment of my invention, it is understood that the invention is capable of various adaptations and that still other changes and modifications may be made or substitutions resorted to which come within the spirit of the invention.

I claim as my invention:

1. In a system of control for an induction motor, in combination, an induction motor having a primary winding and a secondary winding, said motor being coupled to a machine having a moment arm of a selected length at the output end of the machine, first means responsive to the force at the end of the moment arm for producing a voltage proportional to such force, second means responsive to the speed of the motor for producing a voltage proportional to motor speed, voltage unbalancing control means for unbalancing the voltage of the energy supply to the motor to change the torque characteristics of the motor, and means for modifying the operation of said voltage unbalancing control means by the electrical voltages produced by said first and second means.

2. A motor control system comprising a three-phase alternating current motor having three primary windings connected in a loop circuit to thus provide three primary terminals connected in fixed relation with each other, three supply terminals energized with three-phase alternating current energy, the first supply terminal being connected to the first primary terminal and the third supply terminal being connected to the third primary terminal, a transformer primary winding connected across the first and second supply terminals, first adjustable inductance means connected across the second supply terminal and the second primary terminal, a transformer secondary winding for said transformer primary winding and a second adjustable inductance means connected in series with the transformer secondary winding to form a series circuit, said series circuit being connected across the third supply terminal and the second primary terminal, said adjustable inductance means being operable, by variation of the inductance values of said adjustable inductance means, to unbalance the voltage distribution on said primary terminals, and control means for varying the value of the inductances of said inductance means, said control means including motor torque responsive means interconnected with said control means and motor speed responsive means interconnected with said control means for simultaneously altering the inductance values of said inductance means to change the unbalance of the voltage distribution to the primary terminals in a degree varying as motor torque and motor speed.

3. A motor control system comprising a three-phase alternating current motor having three primary windings connected in a loop circuit to thus provide three primary terminals connected in fixed relation with each other, three supply terminals energized with three-phase alternating current energy, the first supply terminal being connected to the first primary terminal and the third supply terminal being connected to the third primary terminal, a transformer primary winding connected across the first and second supply terminals, a first adjustable inductance means connected across the second supply terminal and the second primary terminal, a transformer secondary winding for said transformer primary winding and a second adjustable inductance means connected in series with the transformer secondary winding to form a series circuit, said series circuit being connected across the third supply terminal and the second primary terminal, said two adjustable inductance means being operable, by variation of the inductance values of the variable inductance means, to unbalance the voltage distribution on said primary terminals, and control means for varying the value of the inductances of said inductance means, said control means including manually adjustable voltage producing means, voltage producing means responsive to motor torque, and voltage producing means responsive to motor speed, to thus change the inductances of said inductance means as a function of motor torque, motor speed, and a manually controlled voltage.

4. A motor control system, in combination, an alternating current motor coupled to drive a load and having three primary terminals, a three-phase supply circuit, having three supply terminals, disposed for connection to the primary terminals to supply alternating current energy to the motor, an adjustable impedance for normal loads on the motor adjusted at a selected impedance value and a transformer secondary winding connected in series therewith to form a series circuit, said series circuit being interconnected with the third and second primary terminals and the third supply terminal being connected to the third primary terminal, a second adjustable impedance interconnected with the second supply terminal and the second primary terminal and a transformer primary winding for said transformer secondary winding connected across the first and second supply terminals, said first supply terminal being connected to the first primary terminal said adjustable impedance means being operable, by adjustment of the inductance values of said adjustable inductance means, to unbalance the phase distribution of the supply current relative to the primary terminals, said second adjustable impedance including adjusting means having a relatively wide range of adjustment and including manually adjustable voltage producing means, voltage producing means responsive to the motor load tension in the hoist cable included in the machine to which the motor is coupled and voltage producing means responsive to motor speed, said three impedance adjusting means being interconnected with each other and inductively coupled with the second adjustable impedance to produce a total effect responsive to motor speed, motor load and manual adjustment, to thus control the speed torque characteristics of the motor at will.

5. In a system of control, in combination, a three-phase induction motor having three primary windings, a phase shift transformer having a primary winding and a secondary winding, five connecting junctions, a three-phase supply circuit having three supply terminals connected, respectively, to the first, second, and third junctions, an unbalance limiting reactor winding, an unbalancing reactor winding, a first loop circuit including the first junction, the first motor primary winding, the fifth junction, the second motor primary winding, the third junction, and the third motor primary winding back to the first junction, a second loop circuit including the first junction, the transformer primary winding, the second junction, the unbalancing reactor winding, the fifth junction, the first motor primary winding back to the first junction, a third loop circuit including the third junction, the transformer secondary winding, the fourth junction, the unbalance limiting reactor winding, the fifth junction, and the second motor primary winding back to the third junction, voltage producing means producing an output voltage responsive to the motor speed, voltage producing means producing an output voltage responsive to motor torque, and voltage producing means manually adjustable to produce a selected reference output voltage, and means for selectively varying the reactance value of the unbalancing reactor winding as a function of any two or all three of said output voltages.

6. In a system of control, in combination, a three-phase induction motor having three primary windings, a phase shift transformer having a primary winding and a secondary winding, five connecting junctions, a three-phase supply circuit having three supply terminals connected, respectively, to the first, second, and third junctions, an unbalance limiting reactor winding, an unbalancing reactor winding, a first loop circuit including the first junction, the first motor primary winding, the fifth junction, the second motor primary winding, the third junction, and the third motor primary winding back to the first junction, a second loop circuit including the first junction, the transformer primary winding, the second junction, the unbalancing reactor winding, the fifth junction, the first motor primary winding back to the first junction, a third loop circuit including the third junction, the transformer secondary winding, the fourth junction, the unbalance limiting reactor winding, the fifth junction, and the second motor primary winding back to the third junction, voltage producing means producing an output voltage responsive to the motor speed, voltage producing means producing an output voltage responsive to motor torque, and voltage producing means manually adjustable to produce a selected reference output voltage, means for selectively varying the reactance value of the unbalancing reactor winding as a function of any two or all three of said output voltages, and means responsive to a motor torque in excess of a selected motor torque for increasing the reactance value of the unbalance limiting reactor winding.

References Cited in the file of this patent

UNITED STATES PATENTS

| Re. 22,923 | Wickerham | Sept. 30, 1947 |
| 2,325,454 | Wilcox | July 27, 1943 |
| 2,384,864 | Wickerham | Sept. 18, 1945 |
| 2,386,581 | Wickerham | Oct. 9, 1945 |
| 2,440,319 | Wickerham | Apr. 27, 1948 |
| 2,448,256 | Elliot | Aug. 31, 1948 |
| 2,508,180 | Mahnke | May 16, 1950 |
| 2,550,569 | Lamm et al. | Apr. 24, 1951 |
| 2,597,141 | Wickerham | May 20, 1952 |